April 11, 1961  O. R. HUGGINS  2,979,299
AERIAL CABLE CLAMP
Filed March 20, 1959  2 Sheets-Sheet 1
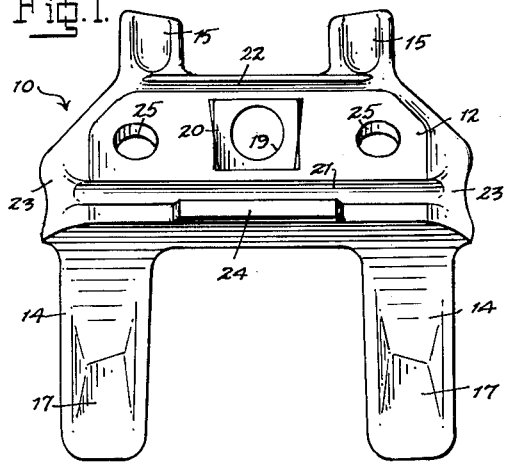
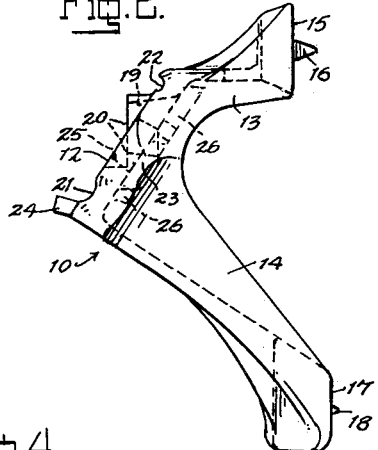
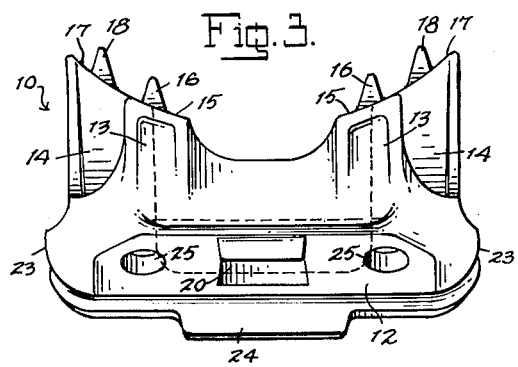
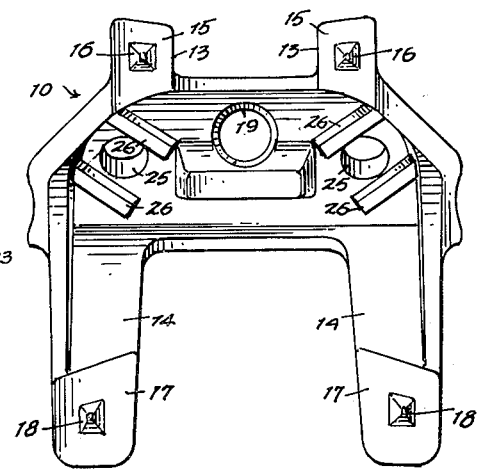
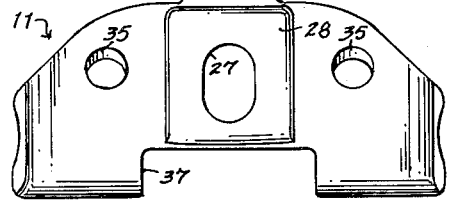
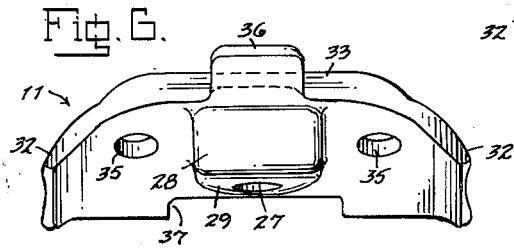
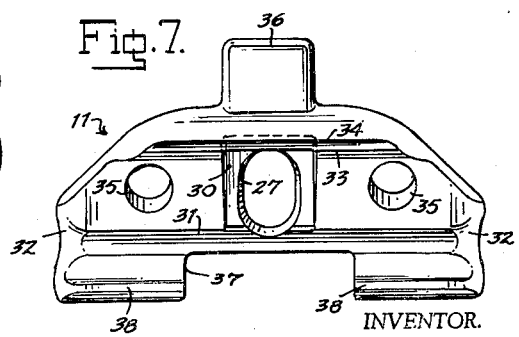
INVENTOR.
OWEN R. HUGGINS
BY
ATTORNEY.

April 11, 1961  O. R. HUGGINS  2,979,299
AERIAL CABLE CLAMP
Filed March 20, 1959  2 Sheets-Sheet 2
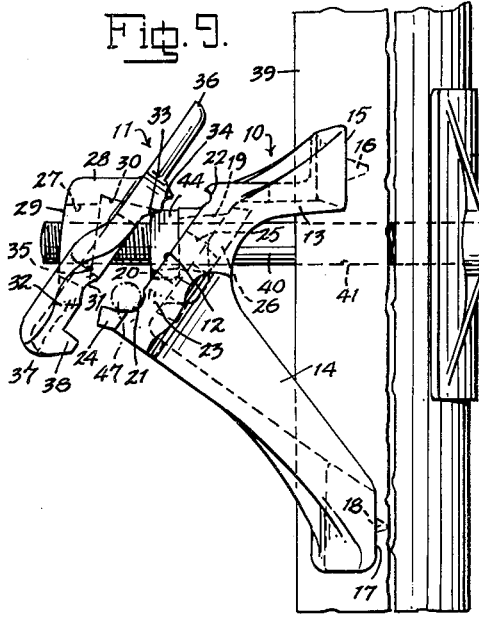
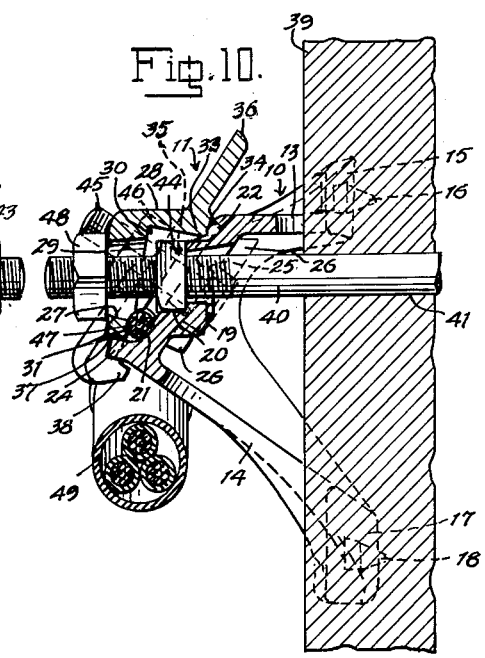
INVENTOR.
OWEN R. HUGGINS
BY
ATTORNEY.

ic pole for the support of a cable messenger wire, an object of the invention being to provide a clamp which will facilitate

United States Patent Office 2,979,299
Patented Apr. 11, 1961

2,979,299

AERIAL CABLE CLAMP

Owen R. Huggins, Darien, Conn., assignor to Malleable Iron Fittings Company, Branford, Conn., a corporation of Connecticut Filed Mar. 20, 1959, Ser. No. 800,862

10 Claims. (Cl. 248—67.5)

The present invention relates to an aerial cable clamp, particularly for attachment to utility line poles for the support of a cable messenger wire, an object of the invention being to provide a clamp which will facilitate the installation of utility lines and will provide more efficient support of the cable messenger.

A further object is to provide a clamp having improved means for supporting the messenger wire during stringing operations and prior to clamping, thus preventing accidental dropping of the wire.

Another object is to provide means for supporting the messenger wire against accidental dropping before tightening the clamping plate, or in the event that the clamping plate becomes loosened.

Another object is to provide a clamp in which the clamping body may be secured to the pole by a through-bolt independently of the clamping plate, so that loosening or removal of the clamping plate will not affect the connection of the clamp body to the pole.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a front elevation of the body member of the clamp of the invention;

Fig. 2 is an end elevation;

Fig. 3 is a top plan view;

Fig. 4 is a rear elevation;

Fig. 5 is a front elevation of the clamping plate member;

Fig. 6 is a top plan view of the clamping plate;

Fig. 7 is a rear elevation of the clamping plate;

Fig. 8 is a front elevation of the assembled clamp mounted upon a pole and showing the cable messenger and cable supported thereby;

Fig. 9 is a side elevation showing the clamp body connected to the pole with the clamping plate shown in separated relation prior to assembly, the dot-and dash lines showing a supported position of a cable messenger wire prior to clamping; and Fig. 10 is a vertical sectional view taken along the line 10—10 of Fig. 8.

Referring to the drawings, the aerial cable clamp, according to the exemplary embodiment of the invention illustrated therein, comprises a pole engaging clamp body 10, shown in detail in Figs. 1–4, and a clamping plate 11, shown in detail in Figs. 5–7, for clamping connection with the clamp body by means of bolts, as will presently more fully appear. The clamp body and clamping plate are preferably in the form of malleable iron castings, although it will be understood that the invention is not limited to this type of structure and material.

The clamp body 10 comprises a forwardly disposed longitudinally extending face portion 12 disposed at a downwardly and outwardly inclined angle, being adapted to be outwardly spaced from the pole to which the clamp body is to be attached by a pair of rearwardly extending substantially horizontal upper legs 13—13, and a pair of rearwardly extending downwardly inclined lower legs 14—14 disposed substantially at right angles to the inclined face portion 12. The legs 13 are each provided with a pole-engaging pad 15 having a pole-embedding spur 16, and the lower legs 14 are each provided with a pole-engaging pad 17 having a pole-embedding spur 18, the rearward inner surfaces of the pads being curved to substantially conform to the round surface of the pole.

The inclined face portion 12 is provided substantially centrally with a through-bolt receiving hole 19 having a horizontal axis, this hole opening to a rectangular vertically disposed pocket formation 20 adapted to receive a nut screwed upon the through-bolt to secure the clamp body to the pole, as will presently more fully appear. A cable messenger receiving longitudinal groove 21 is provided in the face portion adjacent and parallel to its lower edge, and a longitudinally extending groove 22 is provided adjacent and parallel to the upper edge. The ends of the face portion are convexly curved, as at 23—23, and the ends of the groove 21 are also convexly curved and divergently funneled, so that the cable messenger may be angled off from the clamp without bending about a sharp corner.

At the lower edge of the face plate there is provided a forwardly projecting shelf or flange 24, extending along the intermediate portion of the lower edge of the cable messenger groove 21 and disposed tangential to the groove at an upwardly inclined angle, so that it forms a cable retaining shelf support extending forwardly from the lower edge of the groove 21 for supporting a cable messenger prior to clamping, as will presently more fully appear.

In longitudinally spaced relation at each side of the central bolt receiving hole 19, and substantially centrally between the grooves 21 and 22, there are provided longitudinally aligned holes 25—25 having their axes at right angles to the plane of the inclined face portion 12, and which are adapted to receive clamping bolts for securing the clamping plate, as will presently more fully appear. Upon the rearward side of the face plate there are provided at opposite sides of each of the holes 25 a pair of parallel retaining ribs 26—26 adapted to retain the square heads of the clamping bolts against turning, as will presently more fully appear.

The clamping plate 11 substantially corresponds in its length and width dimensions to the face portion 12 of the clamp body, and has a central through-bolt receiving hole 27 provided in a boss formation 28 disposed in angular relation upon the forward side of the clamping plate, so that in the inclined clamping position of the clamping plate the forward side of the boss formation is substantially vertically disposed. The hole 27 is vertically elongated so as to freely receive the end of the through-bolt and at the same time permit tilting movement of the clamping plate, and the forward side of the boss formation 28 is convexly rounded, as at 29, to provide a compensating surface for firm engagement with a nut upon the through-bolt in different positions of angular adjustment of the clamping plate, as will presently more fully appear. At its rearward side the clamping plate is provided with a rectangular angularly disposed recess 30 adapted to provide a clearance space for the through-bolt nut disposed in the pocket formation 20 of the clamp body.

At its inner side the clamping plate is provided in parallel adjacent relation to its lower edge with a longitudinally extending cable messenger receiving groove 31 adapted to oppose the groove 21 of the clamping body in complementary relation, as will presently more fully appear. The ends of the inner side of the clamping plate are convexly curved, as at 32—32, and the ends of the groove 31 are also convexly curved and divergently funneled, so that the clamped cable messenger may be angled off from the clamp without bending about a sharp corner. Adjacent and parallel to the upper edge of the inner side of the clamping plate there is provided an inwardly projecting fulcrum lip 33 adapted in the assembled relation to have fulcrum engagement in the groove 22 of the clamp body. The fulcrum lip 33 is provided with a longitudinal groove 34, adapted to cooperate with the groove 22 to receive and clamp a ground wire, when desired, in which case the ground wire constituten a fulcrum for the clamping plate. This is an optional arrangement, the usual installation having the grooved lip 33 in direct fulcrum engagement with the groove 22.

A pair of bolt receiving holes 35—35 are provided in longitudinally spaced relation at each side of the central hole 27 and substantially centrally between the groove 31 and the fulcrum lip 33 for substantial register with the bolt receiving holes 25—25 of the clamping body.

At the upper edge of the clamping plate there is provided a vertically extending stringer finger 36 for facilitating the stringing of field spun aerial cable, in which case the cable messenger is connected to the cable by spiral binding prior to mounting on the pole. The finger provides for temporary support of the cable messenger prior to clamping. At its lower edge the clamping plate is provided with a notch 37 in which the shelf 24 engages in the assembled relation of the clamp, and at each side of the notch there are provided inwardly projecting longitudinally extending flanges 38—38 which project beneath the lower edge of the clamping plate at each side of the shelf 24 in the assembled relation.

The clamping body 10 is mounted upon the pole 39, as shown in Figs. 8–10, by a through-bolt 40 engaged through a diametrically extending hole 41 in the pole, one projected threaded end of the bolt being engaged through a pole engaging curved washer 42 and secured by a nut 43, while its other projected threaded end is engaged through the central bolt receiving hole 19 of the clamp body and secured by a nut 44 engaged in the pocket formation 20. Tightening of the nuts 43 and 44 forces the leg pads 15 and 17 firmly against the round pole surface and embeds the spurs 16 and 18 in the pole. It will be noted that the inclined relation of the face portion 12 of the clamp body to the lower inclined legs 14 is such that vertical load imposed upon the clamp body will be directly transmitted through the legs to the pole surface, the clamp body tending to swing inwardly at its lower end or overturn as load is increased, placing the through-bolt in tension and causing the leg pads 17 to dig into the pole with increasing resistance to down-slotting.

The clamping plate is engaged with the clamp body by engaging the projecting end of the through-bolt into the center hole 27 and engaging the fulcrum lip 33 in the groove 22, whereupon clamping bolts 45—45 are engaged through the registering holes 25 and 35 of the clamp body and clamping plate and have clamping nuts 46 screwed thereon, the square heads of the bolts being positioned between the retaining ribs 26—26 to prevent turning of bolts.

During the stringing of the cable messenger 47, particularly in the case of the field spun or pre-assembled cable, the cable messenger may be termporarily supported prior to clamping behind the stringer finger 36. When the messenger is to be clamped, the clamping plate is loosened and the cable messenger is placed upon the projecting shelf 24, in which position it is prevented from accidental dropping and is directly in front of the groove 21 in position to be pressed into the groove by tightening of the clamping plate.

The groove 31 of the clamping plate being opposite and complementary to the groove 21 of the clamp body, inward swinging movement of the clamping plate about its fulcrum point will force the cable messenger 47 supported upon the shelf 24 into clamped relation between the grooves 21 and 31, the clamping plate being tightly engaged with the cable messenger through tightening of the nuts 46. It will be noted that the flanges 38 of the clamping plate will provide positive support for the cable in the event that it is pulled downwardly from between the grooves 21 and 31 through excessive force thereon. Additional clamping force is applied to the clamping plate by a nut 48 screwed upon the projecting end of the through-bolt 40 and bearing with line contact upon the rounded face 29 of the boss formation 28 of the clamping plate. A conductor cable 49 is supported beneath the cable messenger 47 by means of a spirally wound binding strip 50, or suitably spaced hanger clips may be employed.

What is claimed is:

1. In an aerial cable clamp for attachment to utility line poles or the like, a clamp body including a face portion generally disposed in a downwardly and forwardly inclined plane and having a horizontal through-bolt receiving hole opening to its forward surface, a part of said forward surface immediately surrounding said hole being disposed to provide a bearing surface normal to the axis of said hole for bearing engagement of a nut screwed upon a horizontal through-bolt extending diametrically through the pole and projected through said hole, and pole-engaging means for supporting said face portion in outwardly spaced relation to the pole including leg means extending rearwardly from its upper portion for engaging the pole above the through-bolt and leg means extending rearwardly from its lower portion for engaging the pole below the through-bolt, a clamping plate opposed to said face portion, said clamping plate and face portion having cooperative fulcrum means disposed above said bearing surface and longitudinally extending complementary cable receiving grooves disposed below said bearing surface, said grooves being in forwardly offset relation to said fulcrum means, and clamping bolt means connected between said clamp body and said clamping plate for exerting clamping pressure upon said clamping plate.

2. The invention as defined in claim 1, further characterized by a longitudinal shelf projecting forwardly from the lower edge of said face portion beneath the lower edge of said clamping plate with its upper surface substantially tangent to the lower edge of the groove of said face portion.

3. The invention as defined in claim 1, further characterized by a longitudinal shelf projecting forwardly from the lower edge of said face portion beneath the lower edge of said clamping plate with its upper surface substantially tangent to and inclined upwardly and forwardly from the lower edge of the groove of said face portion.

4. The invention as defined in claim 1, further characterized by a longitudinal shelf projecting forwardly from the intermediate portion of the lower edge of said face portion with its upper surface substantially tangent to the lower edge of the groove of said face portion, the lower edge of said clamping plate being notched to receive said shelf and having longitudinal flanges projecting rearwardly at each side of the notch to engage beneath the lower edge of said face portion at each side of said shelf.

5. In an aerial cable clamp for attachment to utility line poles or the like, a clamp body including a face portion generally disposed in a downwardly and forwardly inclined plane and having a horizontal through-bolt receiving hole opening to its forward surface, a part of said forward surface immediately surrounding said hole being disposed to provide a bearing surface normal to the axis of said hole for bearing engagement of a nut screwed upon a horizontal through-bolt extending diametrically through the pole and projected through said hole, and pole-engaging means for supporting said face portion in outwardly spaced relation to the pole including leg means extending rearwardly from its upper portion for engaging the pole above the through-bolt and leg means inclined downwardly and rearwardly from its lower portion substantially at right angles to the inclined plane of said face portion for engaging the pole below the through-bolt, a clamping plate opposed to said face portion, said clamping plate and face portion having cooperative fulcrum means disposed above said bearing surface and complementary wire receiving grooves disposed below said bearing surface in forwardly offset relation to said fulcrum means, and clamping bolt means connected between said clamp body and said clamping plate for exerting clamping pressure upon said clamping plate.

6. In an aerial cable clamp for attachment to utility line poles or the like, a clamp body including a face portion generally disposed in a downwardly and forwardly inclined plane and having a horizontal through-bolt receiving hole opening to its forward surface, a part of said forward surface immediately surrounding said hole being disposed to provide a bearing surface normal to the axis of said hole for bearing engagement of a nut screwed upon a horizontal through-bolt extending diametrically through the pole and projected through said hole with an end portion of the through-bolt projected forwardly beyond said nut, and pole-engaging means for supporting said face portion in outwardly spaced relation to the pole including leg means extending rearwardly from its upper portion for engaging the pole above the through-bolt and leg means extending rearwardly from its lower portion for engaging the pole below the through-bolt, and a clamping plate opposed to said face portion having a through-bolt receiving hole in axial line with said through-bolt receiving hole of said face portion for freely receiving said projecting end portion of said through-bolt to permit relative tilting movement of said clamping plate and having a substantially vertically disposed bearing surface at its forward side through which said through-bolt receiving hole of said clamping plate opens for engagement by a second nut screwed upon said projected end portion of said through-bolt for exerting clamping pressure upon said clamping plate, said clamping plate and face portion having cooperative fulcrum means disposed above said bearing surface of said face portion and longitudinally extending complementary cable receiving grooves disposed below said bearing surface of said face portion, said grooves being in forwardly offset relation to said fulcrum means.

7. In an aerial cable clamp for attachment to utility line poles or the like, a clamp body including a face portion generally disposed in a downwardly and forwardly inclined plane having a horizontal through-bolt receiving hole opening to its forward surface, a part of said forward surface immediately surrounding said hole being disposed to provide a bearing surface normal to the axis of said hole for bearing engagement of a nut screwed upon a horizontal through-bolt extending diametrically through the pole and projected through said hole with an end portion thereof projected forwardly beyond said nut, and pole-engaging means for supporting said face portion in outwardly spaced relation to the pole including leg means extending rearwardly from its upper portion for engaging the pole above the through-bolt and leg means extending rearwardly from its lower portion for engaging the pole below the through-bolt, and a clamping plate opposed to said face portion having a through-bolt receiving hole in axial line with said through-bolt receiving hole of said face portion for freely receiving said projected end portion of said through-bolt to permit relative tilting movement of said clamping plate and having a substantially vertically disposed bearing surface at its forward side through which said through-bolt receiving hole of said clamping plate opens for engagement by a second nut screwed upon said projected end portion of said through-bolt for exerting clamping pressure upon said clamping plate, the rearward side of said clamping plate having a recess providing a clearance space in which said first mentioned nut is received, said clamping plate and face portion having cooperative fulcrum means disposed above said bearing surface of said face portion and longitudinally extending complementary cable receiving grooves disposed below said bearing surface of said face portion, said grooves being in forwardly offset relation to said fulcrum means.

8. In an aerial cable clamp for attachment to utility line poles or the like, a clamp body including a face portion generally disposed in a downwardly and forwardly inclined plane and having a horizontal through-bolt receiving hole opening to its forward surface, a part of said forward surface immediately surrounding said hole being disposed to provide a bearing surface normal to the axis of said hole for bearing engagement of a nut screwed upon a horizontal through-bolt extending diametrically through the pole and projected through said hole, and pole-engaging means for supporting said face portion in outwardly spaced relation to the pole including leg means extending rearwardly from its upper portion for engaging the pole above the through-bolt and leg means extending rearwardly from its lower portion for engaging the pole below the through-bolt, a clamping plate opposed to said face portion, said clamping plate and face portion having cooperative fulcrum means disposed above said bearing surface and longitudinally extending complementary cable receiving grooves disposed below said bearing surface, said grooves being in forwardly offset relation to said fulcrum means, said face portion having a pair of clamping bolt receiving holes longitudinally spaced at each side of said through-bolt hole and having their axes normal to the inclined plane of said face portion, and said clamping plate having a pair of clamping bolt receiving holes substantially in register with said clamping bolt receiving holes of said face portion, a pair of clamping bolts engaged through said clamping bolt receiving holes of said face portion and clamping plate, and a pair of nuts screwed upon said pair of bolts for exerting clamping pressure upon said clamping plate.

9. In combination, an aerial cable clamp for attachment to a utility line pole or the like, and a horizontal through-bolt for extending diametrically through said pole or the like with a threaded end portion projected therefrom for engagement with said clamp, said clamp comprising a clamp body including a face portion generally disposed in a downwardly and forwardly inclined plane and having a horizontal through-bolt receiving hole opening to its forward surface through which said projected end of said through-bolt is engaged, a part of said forward surface immediately surrounding said hole being disposed to provide a bearing surface normal to the axis of said hole, a nut screwed upon said projected end portion of said through-bolt and having bearing engagement with said bearing surface, and pole-engaging means for supporting said face portion in outwardly spaced relation to the pole including leg means extending rearwardly from its upper portion for engaging the pole above the through-bolt and leg means extending rearwardly from its lower portion for engaging the pole below the through-bolt, a clamping plate opposed to said face portion, said clamping plate and face portion having cooperative fulcrum means disposed above said bearing surface and longitudinally extending complementary cable receiving grooves disposed below said bearing surface, said grooves being in forwardly offset relation to said fulcrum means, and clamping bolt means connected between said clamp body and said clamping plate for exerting clamping pressure upon said clamping plate.

10. In combination, an aerial cable clamp for attachment to a utility line pole or the like, and a horizontal through-bolt for extending diametrically through said pole or the like with a threaded end portion projected therefrom for engagement with said clamp, said clamp comprising a clamp body including a face portion generally disposed in a downwardly and forwardly inclined plane and having a horizontal through-bolt receiving hole opening to its forward surface through which said projected end of said through-bolt is engaged, a part of said forward surface immediately surrounding said hole being disposed to provide a bearing surface normal to the axis of said hole, a nut screwed upon said projected end portion of said through-bolt and having bearing engagement with said bearing surface with an end portion of said through-bolt projected forwardly beyond said nut, and pole-engaging means for supporting said face portion in outwardly spaced relation to the pole including leg means extending rearwardly from its upper portion for engaging the pole above the through-bolt and leg means extending rearwardly from its lower portion for engaging the pole below the through-bolt, and a clamping plate opposed to said face portion having a through-bolt receiving hole in axial line with said through-bolt receiving hole of said face portion in which said projected end portion of said through-bolt is freely received to permit relative tilting movement of said clamping plate and having a substantially vertically disposed bearing surface at its forward side through which said through-bolt receiving hole of said clamping plate opens, a second nut screwed upon said projected end portion of said through-bolt in engagement with said bearing surface of said clamping plate to exert clamping pressure upon said clamping plate, said clamping plate and face portion having cooperative fulcrum means disposed above said bearing surface of said face portion and longitudinally extending complementary cable receiving grooves disposed below said bearing surface of said face portion, said grooves being in forwardly offset relation to said fulcrum means.

References Cited in the file of this patent

UNITED STATES PATENTS

| | | |
|---|---|---|
| 1,738,447 | Quist | Dec. 3, 1929 |
| 2,334,560 | Kennedy | Nov. 16, 1943 |
| 2,590,415 | Jenne | Mar. 25, 1952 |
| 2,698,151 | Jenne | Dec. 28, 1954 |